United States Patent
Weaver et al.

(10) Patent No.: US 7,050,569 B1
(45) Date of Patent: May 23, 2006

(54) SELECTING AN INTERACTIVE APPLICATION TO RUN WHILE A CALLER IS ON HOLD DEPENDING ON THE CALLER'S EXPECTED WAIT TIME

(75) Inventors: Farni Weaver, Spring Hill, KS (US); Piyush Jethwa, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 10/637,875

(22) Filed: Aug. 8, 2003

(51) Int. Cl.
*H04M 3/523* (2006.01)
*H04Q 3/64* (2006.01)

(52) U.S. Cl. .......................... 379/266.01; 379/266.02; 379/266.03; 379/266.05; 379/266.06

(58) Field of Classification Search ................ 370/412; 379/265.01, 265.02, 266.01, 266.02, 266.03, 379/266.04, 266.05, 266.06, 266.07, 266.08
See application file for complete search history.

(56) References Cited

U.S. PATENT DOCUMENTS

| | | | |
|---|---|---|---|
| 6,088,444 A * | 7/2000 | Walker et al. | 379/266.02 |
| 6,665,395 B1 * | 12/2003 | Busey et al. | 379/265.09 |
| 6,801,520 B1 * | 10/2004 | Philonenko | 370/351 |
| 2002/0196927 A1 * | 12/2002 | Johnson et al. | 379/265.02 |
| 2003/0103619 A1 * | 6/2003 | Brown et al. | 379/266.01 |
| 2004/0174980 A1 * | 9/2004 | Knott et al. | 379/266.01 |

* cited by examiner

Primary Examiner—Harry S. Hong

(57) ABSTRACT

The present invention, relates to an automated call distribution platform that has the ability to analyze a call queue and determine if a call qualifies for participation in an interactive application, invite a caller to participate in the application and, if the caller agrees, execute the application, then after completion of the application the call advances in the queue to a position ahead of where it currently resides. Thus, the present invention has both the benefit of lessening the caller's wait in a call queue and allows that automated call distribution platform owner to have its customers participate in an application. An exemplary application may be a survey, that can collect valuable information from the callers.

5 Claims, 3 Drawing Sheets

SELECTING AN INTERACTIVE APPLICATION TO RUN WHILE A CALLER IS ON HOLD DEPENDING ON THE CALLER'S EXPECTED WAIT TIME

FIELD OF THE INVENTION

The present invention relates to systems that allow a caller in a holding queue to select an interactive application, while in the holding queue where at the end of the application the caller's position in the queue would be improved.

BACKGROUND OF THE INVENTION

The use of computer controlled central call centers that employ automatic call distribution ("ACD") platforms has grown greatly. Such systems are particularly useful in customer service centers and product support lines. An ACD platform functions to receive incoming calls and then manages and routes those calls in an appropriate fashion. In one form of call center, an ACD platform will receive an incoming call and then forward the call to the next available operator. This may be done, for example, to manage operator work load or distribute calls more evenly. In another system an ACD platform may prompt the caller with certain questions that assists in managing the call. Through the responses to these prompts the ACD platform may further refine where to send the call.

The ACD platform may work in conjunction with a voice command platform ("VCP") to accomplish the prompts discussed above. A voice command platform allows the system to engage in interactive voice and/or DTMF communication with a caller. One such VCP is an Interactive Voice Response Unit ("IVRU"). Other types of VCP's also exists, including VXML based platforms. These platforms generally include a processor, data storage and a communication interface. The communication interface provides a link for communication with a caller. The data storage unit includes logic executable by the processor to play prerecorded voice prompts to a caller, to receive the callers responses and to process the call according to those responses. This processing can include many things including passing the call to another prompt, passing the call to a response recorded message or passing the call to an operator for handling.

Often, especially when the call is directed to an operator, an ACD platform will pass a call to a queue of phone calls waiting for operator assistance. The operator then receives the calls in the order in which they are placed in the queue. As a result, when call traffic is heavy, a caller can be in the queue for a significant amount of time before receiving operator assistance.

SUMMARY OF THE INVENTION

Waiting in a calling queue is an inconvenience to the caller. Generally, those waiting in an ACD platform callers queue represent the customers or potential customers of the ACD platform owner. Having callers available and waiting is both a potential opportunity for owner of the ACD platform and a potential liability. As customers or potential customers, these callers represent a valuable source of information, but keeping callers in a call queue for too long a period of time can leave a negative impression. Thus, there is a need for a system that allows the caller to improve his position in the call queue and shorten the wait time. In addition, there is a need for a system that allows ACD platform owners to take advantage of opportunity presented by the availability of its customers or potential customers in the caller queue. The present invention is directed to both this problem and this opportunity.

Pursuant to the present invention, an ACD platform has the ability to analyze a call queue and determine if a call qualifies for participation in an interactive application. If the call qualifies, then the ACD invites the caller to participate in the application. If the caller agrees to participate in the application, then after completion of the application the call advances in the queue to a position ahead of where it currently resides. Thus, the present invention has both the benefit of lessening the caller's wait in a call queue and allowing that ACD platform owner to have its customers participate in an application. An exemplary application may be a survey, wherein the ACD platform owner can collect valuable information from its customers to help improve its products and services.

Determining whether a call qualifies to participate in an application such as a survey may be done by analysis of the call queue. When an ACD platform establishes a call queue it is possible to maintain certain information about both the individual calls and the call queue as a whole. Some basic information includes: (1) the number of calls in the queue, (2) the place of the call in the queue, (3) the average time it takes for a call to move up in the queue and (4) the time the caller has been in the queue. This information allows the ACD platform to analyze each call to determine whether it satisfies the criteria to participate in the application. The criteria are typically set such that the call is deep enough into the queue that participation in the application does not adversely affect the caller, i.e., slow down the time it takes to talk to an operator. This criteria can be preset and may vary with each application. Of course, the system can also be programmed to interrupt the application and forward the call to an operator should one become available.

Once the call qualifies to participate in the application, the VCP will prompt the caller to ascertain if the caller wants to participate in the application. The VCP may provide information to assist the caller in making the choice. For example the VCP may advise the caller of: (1) her place in the queue; (2) the approximate time until she will receive operator attention; (3) the option to advance in the queue by participating in the application; (4) the nature of the application; and (5) the time to operator assistance if she does participate in the application. The VCP then waits for a response from the caller. The response may be verbal or a DTMF tone. If the caller chooses to participate in the application, the ACD platform then transfers the call to the application. If the caller declines, then the caller remains in her present location in the queue and advances as the queue advances.

Once the call is transferred to the application, the VCP conducts the application. In the example of a survey, the VCP will prompt the caller with the questions from the survey. The caller will in turn respond to the questions. Again, depending on the survey, the responses can be spoken or a DTMF tone. Once the caller completes the application, the call is returned to the call queue at location in advance of where it was previously with respect to the rest of the queue. Alternatively, the caller is placed in a second preferred queue resulting in a shorter wait time.

Thus, the present invention not only saves the caller time, but also provides a valuable tool for the ACD platform owner. This and other aspects of the invention are discussed in the drawings and detailed description below.

DESCRIPTION OF FIGURES

An exemplary embodiment of the present invention is described herein with reference to the drawings, in which.

DETAILED DESCRIPTION OF AN EXEMPLARY EMBODIMENT

Figure 1:
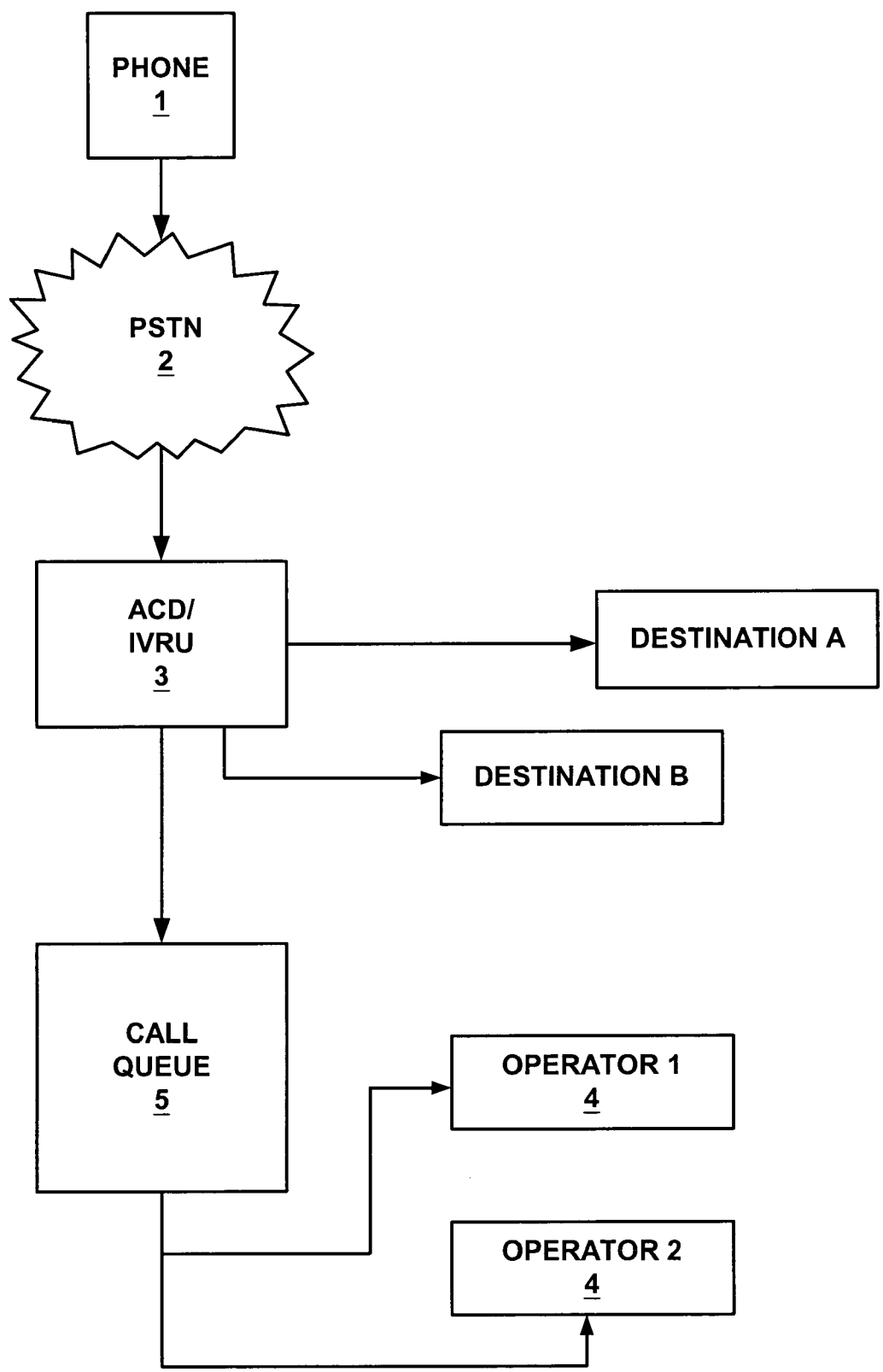
FIG. 1 is a diagram generally demonstrating the operation of call center employing automated call managers within a telephone system.

The present invention involves the management of a phone call received by an ACD platform. FIG. 1 illustrates the general operation of the ACD within the public switched telephone network (PSTN). A caller makes a call from a phone 1 over the PSTN 2 and the call is answered by a call center through the ACD platform 3. In responding to the call, ACD platform 3 activates the IVRU to interface with the caller. The ACD platform 3, generally in response to information received from the caller, directs the call to an appropriate destination. One such destination may be a human operator 4. If there is an operator available, then the operator receives the call directly. If, on the other hand, all operators are busy, the call is placed into a call queue 5. Once the call reaches the front of the queue 5, it is directed to the next available operator 4.

The ACD platform utilized in the present invention has the capability to allow a caller, who is waiting in a call queue, to advance in the call queue by participating in an interactive application such as a survey. By advance, it is meant that the caller can reduce the wait time, thus improving the call's position in the call queue 5 relative to other calls in the queue 5. However, to determine whether the call can qualify to participate in the application, the ACD platform 3 may analyze the call with respect to its position in the call queue 5. For optimal performance, the call should meet certain criteria before given the option to participate in the interactive application. The system, generally in data storage, contains qualification logic that contains the qualification criteria and is executed on a processor to analyze the call and the call queue 5 to determine if it is appropriate to offer the caller the opportunity to participate in the interactive application. One normal criterion would be whether the estimated wait in the call queue exceeds the time necessary to complete the application. Absent meeting this criteria, it is unlikely that the total wait time of the caller can be shortened. The criteria to qualify may, however, vary from application to application. Indeed, the ACD platform 3 may be programmed to support multiple applications each being implemented with differing criteria, for example applications that take longer to complete may be triggered in call queues with longer wait times.

In general, the criteria for qualification will include, at least, the position of the call in the call queue 5 and the estimated time to being serviced by an operator. Other criteria may be appropriate depending on the application. The criteria for qualification are typically preset with the application and tailored to ensure minimal caller inconvenience.

Figure 2:
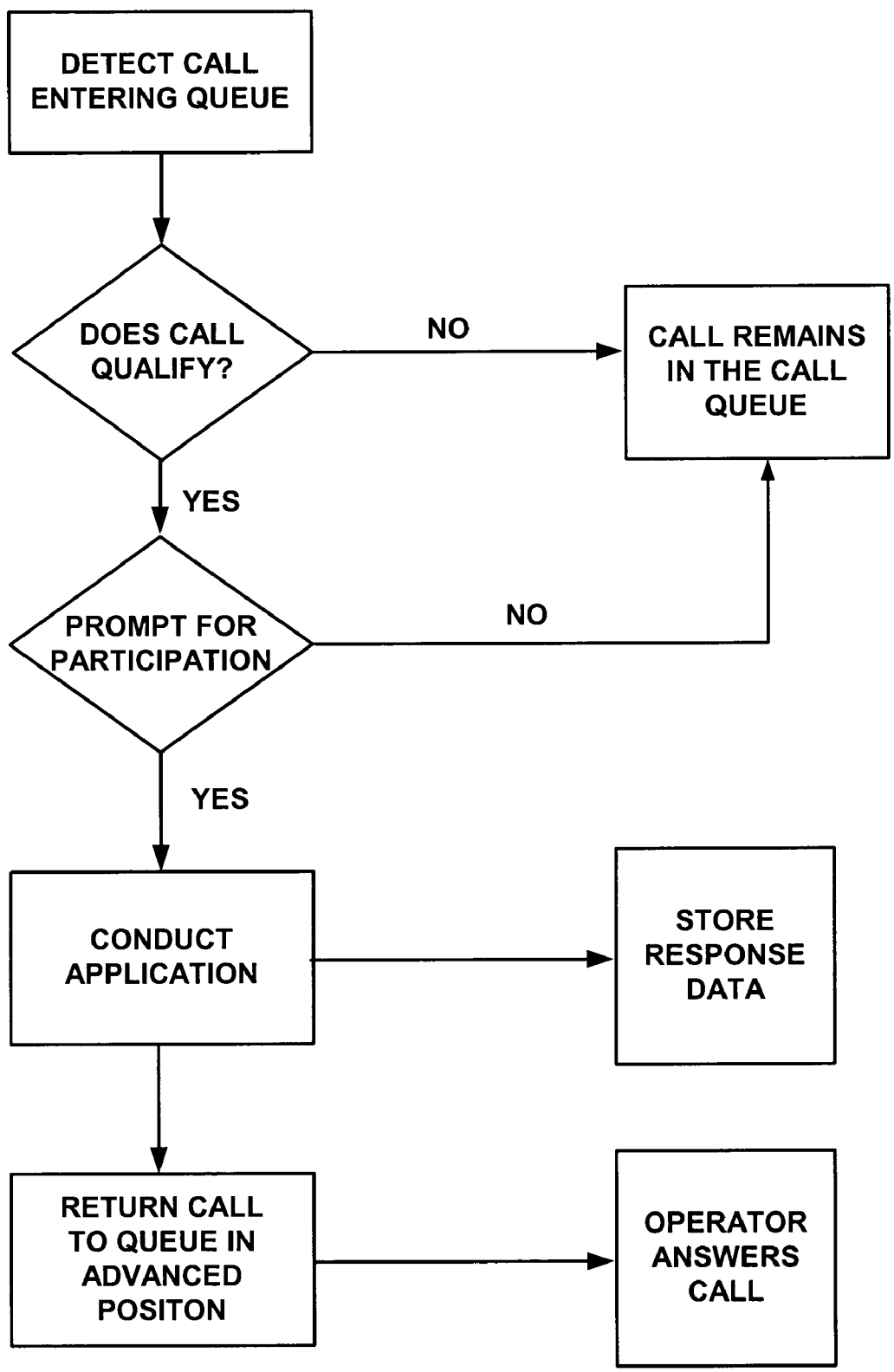
FIG. 2 is a diagram generally illustrating the operation of an automated call managers relevant to the present invention.

FIG. 2 illustrates the operation of the present invention within the general system illustrated in FIG. 1. FIG. 2 illustrates that once a call in the call queue is identified as qualifying for the application, then the IVRU prompts the caller and inquires if the caller is interested in participating in the application. The IVRU is capable of receiving communications from the caller either by voice or DTMF tones. If the caller responds to the prompt in the affirmative the application is activated. If the response to the prompt is in the negative the call remains in the call queue undisturbed.

As noted above the prompt could include as much or as little information as appropriate for the application or the particular use. The prompt may be nothing more than a spoken request to participate in an application such as a survey. However, the prompt may also include more information to entice the caller to participate in the application, such as, the caller's location in the call queue, the expected wait time, the length of the application, the purpose of the application, and the benefit of participating in the application. In this regard, the benefit is envisioned to be anything that may be beneficial to both the caller and the ACD platform owner. An exemplary benefit may be advancing the caller in the call queue, transferring the call to a preferred call queue or some other benefit unrelated to the call queue such as an entry into a prize drawing or a discount on a product.

If the caller affirmatively responds to the invitation to participate in the application, then the call is transferred for performance of the application. Application logic, for example survey logic, is then executed on the processor. Through the IVRU, or other appropriate interface, the caller responds to the application until complete.

Once the caller has completed the application, the caller is then returned to a call queue where the caller can reach an operator. As indicated above one incentive to participate in the application may be that the caller is advanced in the call queue. The ACD platform of the present invention has the ability to track the location of a call is in the call queue and to track the call's progress through the queue. Advancement logic for defining the nature of the advancement in the queue is stored on data storage and executed on the processor when the caller completes the application resulting the call improving its position in the queue. An example of advancing a call in the call queue may be moving the call five positions in front of where it would have otherwise been had the caller not participated in the application. Another exemplary embodiment may be to put the call into a separate preferred queue where the wait time is shorter.

As noted the application may be any appropriate application. One exemplary application is a survey. The owner of the ACD platform may take this opportunity to find out what the callers think about the company or its products through an appropriately designed survey. The survey may consist of a series of prompts from the IVRU and answers from the caller. Again the caller's answers can be either in the form of voice responses or DTMF tones depending on the design of the survey. The information obtained from the survey can then be stored in an appropriate storage medium (RAM, hard drive, magnetic storage devices or the like) for further analysis.

EXAMPLE A

Figure 3:
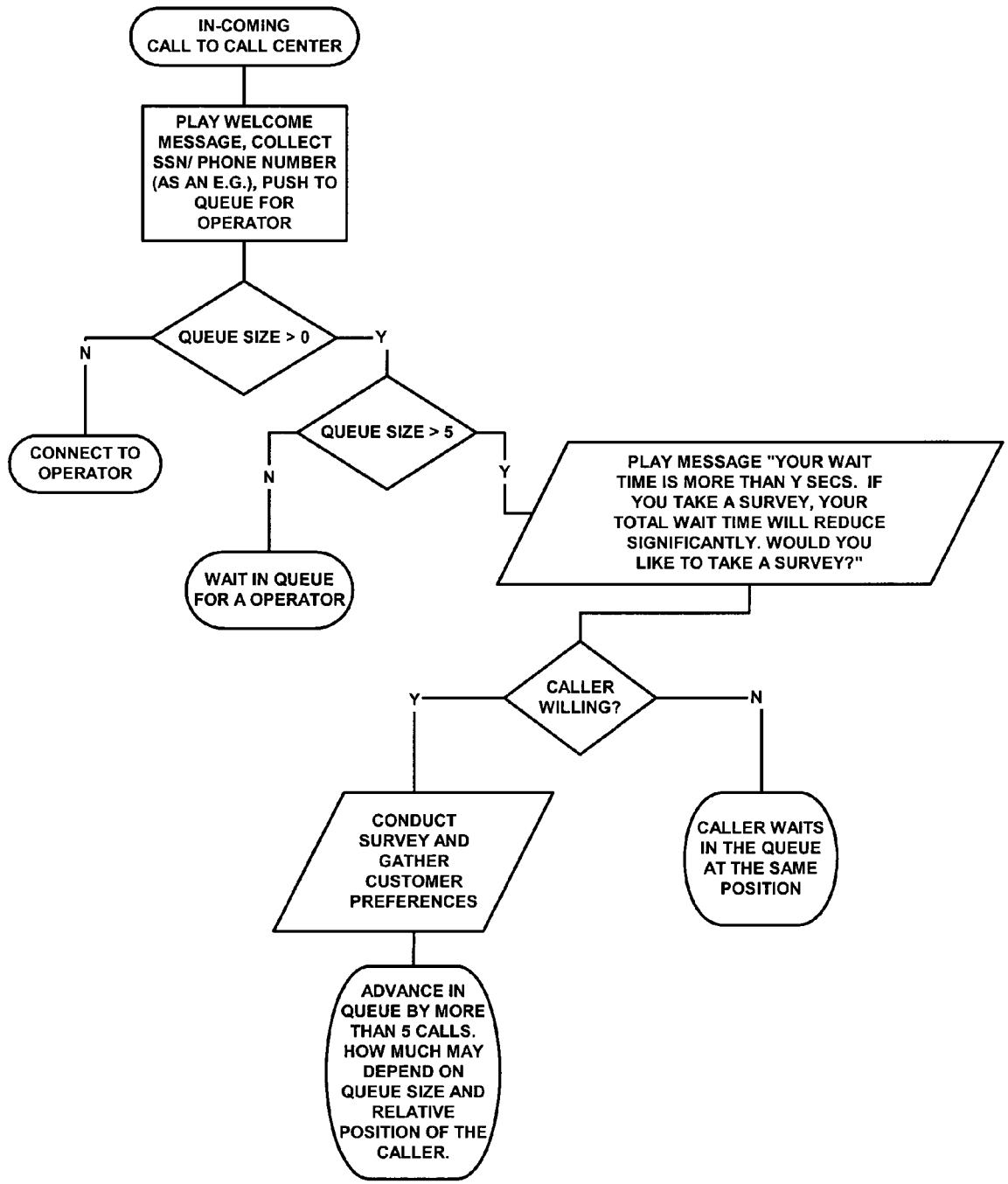
FIG. 3 is a diagram illustrated the operation of the present invention in a specific application.

A specific embodiment of the present invention is shown in FIG. 3. In the application of FIG. 3 the application is a survey where the average time to take the survey is five times the average call handling time. Thus, in the system of FIG. 3, a call qualifies for participation in a survey if it is greater than the fifth call in the call queue.

FIG. 3 illustrates the ACD platform at the call center receiving an incoming call. The ACD platform answers the call with a welcome and obtains the appropriate information from the caller to determine where to direct the call. One option for the caller is to speak with an operator. If the caller selects this option, the system then analyzes the call queue. If there are no calls waiting in the queue the call is directed immediately to the operator. If there are calls waiting in the call queue, then the number of calls is counted. If the number of calls is equal to or less than five the call remains in the queue and there is no offer to participate in the survey. If the number of calls exceeds five then the incoming call qualifies to participate in the survey. When the call qualifies for the survey a prompt offering participation is presented to the caller by the system. If the caller declines the offer, the call remains in the call queue at its same position. If the caller accepts the invitation, then the survey is conducted. Upon completion of the survey, the call is advanced in the call queue at least 5 calls from it original location. Thus, if the caller were the sixth call in the call queue after the survey the caller would advance to the front to the call queue.

An exemplary embodiment of the present invention has been illustrated and described. Those skilled in the art will understand, however, that changes and modifications may be made to the invention without deviating from the scope of the invention, as defined by the following claims. Further, the claims should not be read as limited to the described order of elements unless stated to that effect.

We claim:

1. In a call control system of the type that receives calls from callers and maintains a queue of calls awaiting connection to an operator, a method comprising:
   qualifying a call in the queue to participate in an interactive application, wherein such qualification includes (1) estimating how long a caller's expected wait time is (2) determining the location of the call in the queue, and (3) determining the time the caller has already been in the queue;
   prompting a caller with a qualifying call in the queue to participate in a application, including advising the caller of (1) the call's location in the queue, (2) the approximate time until the call will be connected to an operator, (3) the option to advance in the queue by participating in an application, (4) the nature of the application and (5) the estimated time to connection to an operator with participation in the application;
   receiving a response from the caller indicating the caller's willingness to participate in the application;
   interactively presenting the application to the caller; and
   transferring the caller's call to a preferred queue with a shorten wait time upon completion of the application.

2. A call control system comprising: (i) a processor, (ii) data storage, (iii) a communication interface, and (iv) machine language instructions stored in the data storage for carrying out functions comprising:
   qualifying a call in the queue to participate in a survey, wherein such qualification includes (1) estimating how long a caller's expected wait time is (2) the location of the call in the queue, and (3) the time the caller has already been in the queue;
   prompting a caller with a qualifying call in the queue to participate in a survey wherein said call has associated with it a defined location in the call queue said prompting including advising the caller of (1) the call's location in the queue, (2) the approximate time until the call will be connected to an operator, (3) the option to advance in the queue by participating in an survey, (4) the nature of the survey and (5) the estimated time to connection to an operator with participation in the survey;
   receiving a response from the caller indicating the caller's willingness to participate in the survey;
   interactively presenting the survey to the caller; and
   advancing transferring the caller's call to a preferred queue with a shorten wait time upon completion of the survey.

3. An automated call distribution platform comprising:
   a communication interface for receiving incoming calls from callers;
   a data storage device for holding the calls in a call queue as the callers wait for operator connection;
   a processor functionally associated with the data storage device and the interface;
   qualification logic stored in said data storage device and executed on said processor for determining if the call qualifies to participate in the survey including determining (1) how long a caller's expected wait time is, (2) the location of the call in the queue and (3) the time the caller has already been in the queue;
   survey logic stored in said data storage device and executed on said processor for interactively presenting a survey to a caller with a qualifying call; and
   advancement logic stored in said data storage device and executed on said processor for shortening the waiting time until the caller is connected with an operator.

4. The automated call distribution platform of claim 3 wherein the advancement logic is capable of moving the call forward a preset number of positions in the queue.

5. The automated call distribution platform of claim 3 wherein the advancement logic is capable of moving the call to a second preferred queue.

* * * * *